Jan. 25, 1949.
R. J. STANTON
2,459,971
INDUCTOR FOR HIGH-FREQUENCY
INDUCTION HEATING APPARATUS
Filed Aug. 30, 1945
3 Sheets-Sheet 1
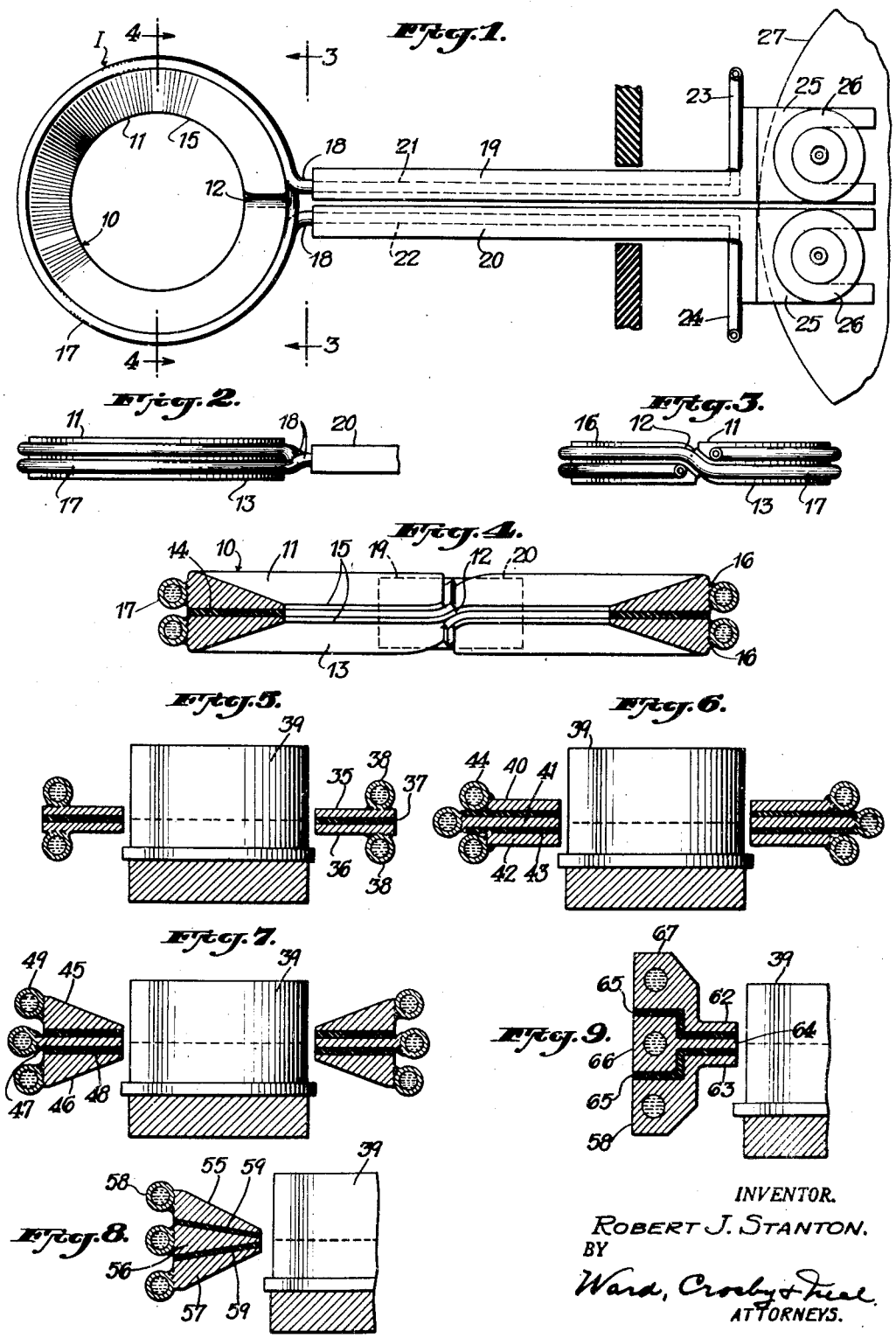
INVENTOR.
ROBERT J. STANTON.
BY
Ward, Crosby & Furl
ATTORNEYS.

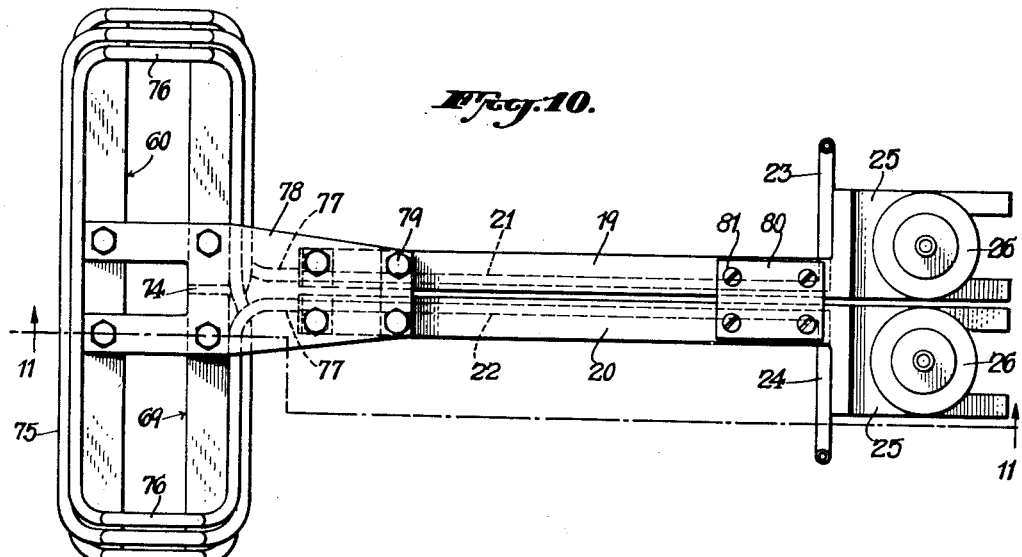
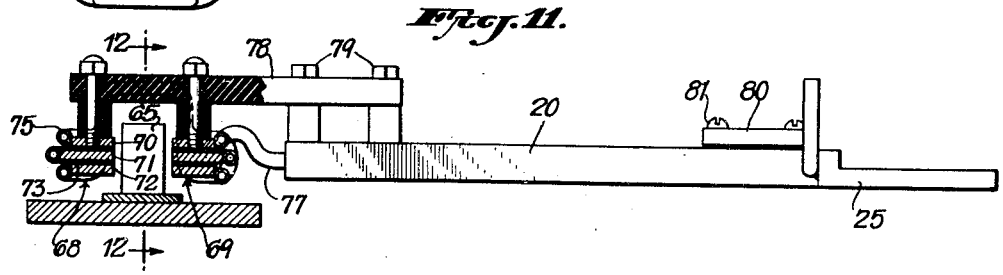
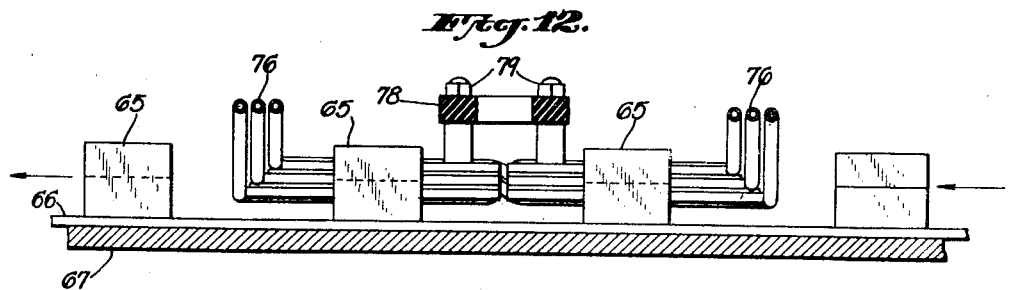
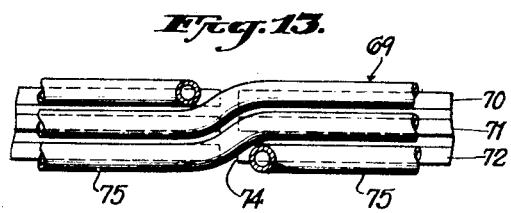

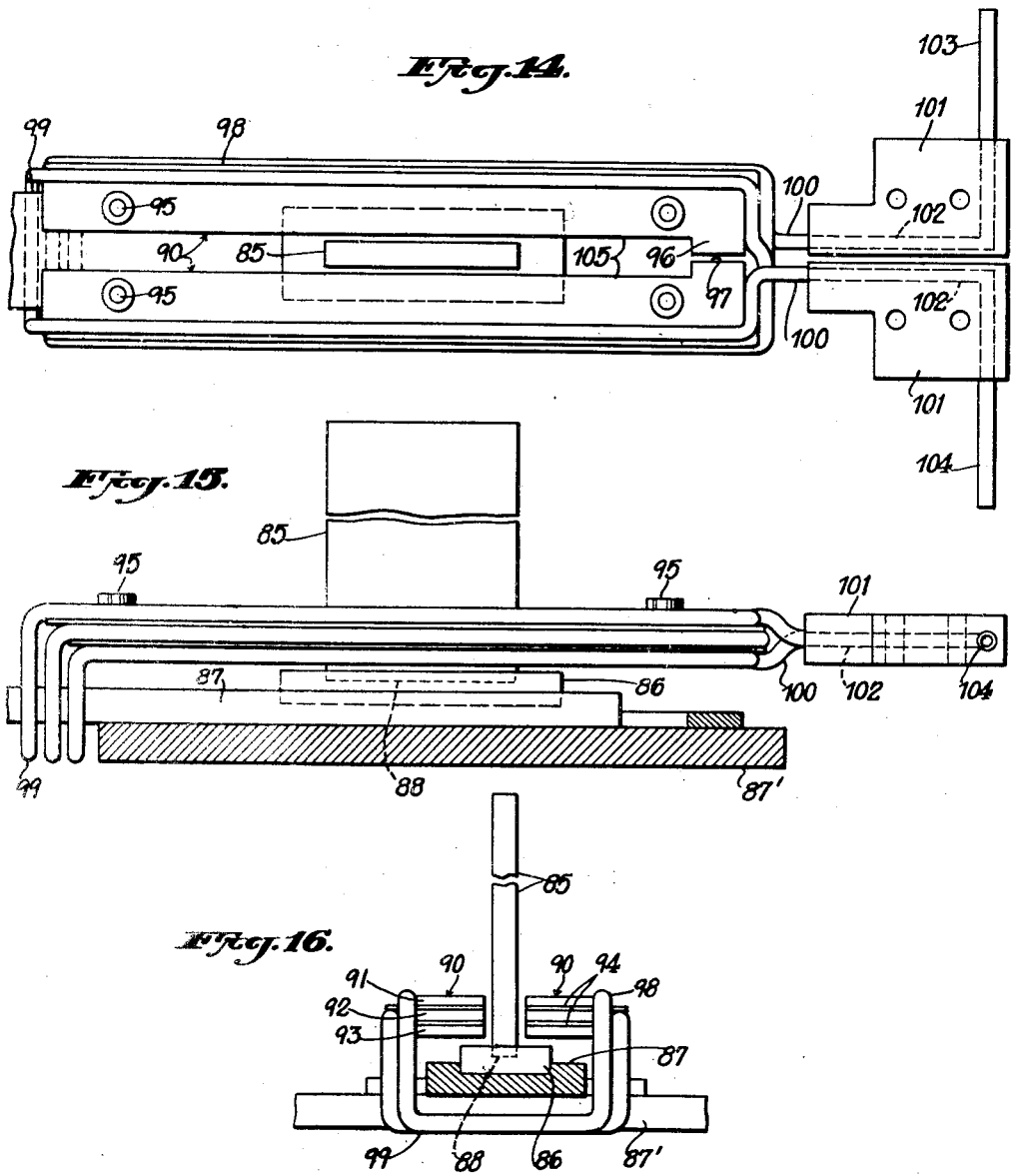

Patented Jan. 25, 1949

2,459,971

UNITED STATES PATENT OFFICE 2,459,971

INDUCTOR FOR HIGH-FREQUENCY INDUCTION HEATING APPARATUS

Robert J. Stanton, Brooklyn, N. Y., assignor to Induction Heating Corp., New York, N. Y., a corporation of New York Application August 30, 1945, Serial No. 613,584

9 Claims. (Cl. 219—13)

This invention relates to induction heating apparatus, and, more particularly, to such apparatus for establishing an electromagnetic field of high intensity for surface hardening, brazing operations and other purposes.

In induction heating apparatus, it is desirable to utilize an electromagnetic field of very great intensity to rapidly heat and harden the exterior surface of an object, so that the heating operation may be completed before the heat penetrates to the interior and the physical properties of the interior portions may remain substantially unchanged. Inductor coils heretofore utilized have commonly been formed from copper tubing so that the distance between adjacent turns of the coil has been limited by the diameter of the tubing employed. With the apparatus of the present invention, the magnetic field is established by a series of closely spaced plate or plate-like portions which are constructed and arranged to form a low impedance path closely adjacent the surface of the object to be heated so that the electromagnetic field is concentrated and the effective distance between adjacent turns of the coil is considerably reduced.

Accordingly, the object to be heated is subjected to a very intense electromagnetic field with the result that a large amount of power is dissipated at the outer surface of the object and said outer outer surface is rapidly heated to the desired temperature and hardened, the operation being completed before the heat penetrates excessively to the interior portions of the object. A cooling fluid conduit of sufficient size to afford adequate cooling of the inductor is provided for each of the plate portions and the inductor is constructed so that the presence of the cooling fluid conduit does not interfere with the close spacing between the inductive surfaces of the respective plate portions.

The intense localized high frequency field established by the novel inductors may also be utilized for brazing objects which are formed from material such as brass or copper which are excellent conductors of heat but which are heated by induction more slowly than ferro-magnetic metals. The intense field established by the novel inductors of the present invention quickly heats the metal at the brazing zone to the desired temperature before the heat is conducted away to other parts of the objects.

Various other objects, features and advantages of the invention will clearly appear from the detailed description given below taken in connection with the accompanying drawings forming a part of the specification and illustrating by way of example, preferred forms of apparatus which may be used in carrying out the invention. The invention resides in such novel features, arrangements, and combinations of parts as may be shown and described in connection with the apparatus herein disclosed.

In the drawings:

Fig. 1 is a plan view of an inductor which is adapted for the surface hardening or brazing of circular objects;

Fig. 2 is a front elevational view of a portion of the inductor shown in Fig. 1;

Fig. 3 is a sectional view taken along the line 3—3 of Fig. 1;

Fig. 4 is an enlarged sectional view taken along the line 4—4 of Fig. 1;

Figs. 5 to 9, inclusive, are diagrammatic views illustrating modifications of the invention;

Fig. 10 is a plan view of another modified form of the invention;

Fig. 11 is a sectional view, taken along line 11—11 of Fig. 10;

Fig. 12 is a sectional view taken along the line 12—12 of Fig. 11, showing a plurality of objects disposed within the heating zone;

Fig. 13 is an enlarged fragmentary elevational view illustrating a feature of the invention;

Fig. 14 is a plan view of a further modification of an inductor constructed in accordance with the invention; and Figs. 15 and 16 are, respectively, front elevational and end elevational views of the inductor shown in Fig. 14 with an assembly in position to be brazed thereby.

Referring to the drawings in detail, the inductor I show in Figs. 1 to 4, inclusive, is particularly adapted for the surface heating of objects having a generally circular cross-section. According to this form of the invention, an intense electromagnetic field is established by a two turn annular inductor member 10 comprising an upper circular portion 11 which merges as at 12 into a lower circular portion 13. The upper and lower circular portions 11 and 13 may be separated by a strip 14 of mica or other insulating material and said portions are substantially symmetrical with respect to the central horizontal plane of the inductor, Fig. 4. Both the upper and lower circular portions 11 and 13 are tapered and the relatively narrow inner surface 15 of each of said circular portions forms a low impedance path which carries the greater part of the current during operation of the inductor in the manner hereinafter described. Accordingly, the inner surfaces 15 of the inductor are equivalent to a two turn coil, the turns of which are very closely spaced, so that an intense electromagnetic field is established which is largely localized and confined to the area bounded by these inner surfaces.

Due to the described tapered construction, the outer peripheral surface 16 of each of the circular portions 11 and 13 is of considerably greater width than the corresponding inner surface 15 so that a cooling fluid conduit 17 of sufficient size to afford adequate cooling of the inductor may be brazed or otherwise suitably secured to said outer peripheral surfaces, the conduit 17 extending around the upper circular portion 11, thence downwardly, Fig. 3, along the merging portion 12, and around the lower circular portion 13. The end portions 18, 18 of the conduit 17 are brazed or otherwise suitably secured to a pair of copper bars or conductors 19 and 20, respectively, the end portions 18, 18 communicating, respectively, with passages 21, 22 which are formed in the respective conductors 19, 20 and extend from end to end thereof. The passage 21 communicates with an inlet tube 23 and the passage 22 communicates with an outlet tube 24. Accordingly, it will be apparent that a continuous stream of cooling fluid may be passed through conduit 17 during operation of the inductor. It will be noted that the conduit 17 is secured to the relatively wide outer peripheral surfaces 16 which are of sufficient size that adequate cooling of the inductor is effected while, as previously stated, the current flow is largely confined to the low impedance path defined by the narrow inner surfaces 15 of the inductor member 10.

The conductors 19 and 20 are of equal length and are closely spaced in order to minimize induction. A lug as at 25 may be secured to each of the conductors 19 and 20, each lug 25 being adapted to engage a secondary terminal 26 of a suitable high frequency transformer, portions of which are indicated at 27, for supplying high frequency current, in a known manner, to the inductor.

The operation is as follows: Assuming that water or other cooling fluid is passing through the inductor in the manner previously described, the transformer 27 is energized to thereby establish a circuit through the inductor. As previously stated, the flow of current through the inductor member 10 is largely confined to the inner surfaces 15 which form a low impedance path for the current so that an intense localized magnetic field is established within the area bounded by the inner surfaces 15, 15. It will be noted that spacing between adjacent "turns" of the inductor is determined only by the thickness of the insulating strip 14 and this effective spacing is not controlled by the distance between adjacent "turns" of the conduit 17 or by the size of such conduit. Consequently, the conduit may be of large enough diameter to afford adequate cooling without interfering with the desired concentration of the magnetic field established by the inductor.

Assuming that the electromagnetic field has been established in the described manner, the object to be heated is supported in any suitable manner or moved through the annular member 10 and, due to the intensity of the magnetic field around the inner edge of the inductor, a large amount of power is dissipated at the surface of the object immediately adjacent such edge with the result that such surface is rapidly heated to the desired temperature and may be hardened as by quenching before the heat penetrates to the interior portions of the object. The inductor may be advantageously used for brazing metals such as brass, copper and the like where rapid and localized heating is desirable. It will be understood that the invention is not to be limited to the two turn form shown in Figs. 1 to 4. Other inductor constructions to obtain a very strong and localized electromagnetic field for inductively heating an object while, at the same time, providing for the use of cooling fluid conduits of sufficient size to afford adequate cooling of the inductor are illustrated diagrammatically in Figs. 5 to 9, inclusive. When these constructions are utilized in connection with the circular type of inductor shown in Fig. 1, it will be understood that the various plate portions are of annular configuration and that the top plate portion is connected to the next lower plate portion. Where a "three turn" coil is utilized, the middle plate portion is connected to the bottom plate portion. These connections may be made by the use of merging portions as shown at 12, Fig. 3, or in any other suitable manner.

In the modification shown in Fig. 5, the inductor consists of top and bottom plate portions 35, 36 separated by a strip of mica or other insulating material as at 37. As shown, a conduit 38 through which the cooling medium passes is brazed or otherwise suitably secured to the upper edge of the plate portion 35 and the lower edge of the plate portion 36 rather than to the outer peripheral surfaces of said plate portions. With this construction, the current is concentrated along the inner edges of the plates 35 and 36 with the result that a very intense and highly localized electromagnetic field is established. When a metallic object as at 39 is placed within the field, the outer surfaces thereof adjacent the inner edges of the plate portions are very rapidly heated to the desired hardening temperature before the heating effect penetrates to the inner portions of the object or extends to surface portions more remote from said inner edges.

The construction shown in Fig. 6 comprises upper, middle and lower plate portions 40, 41 and 42, and strips 43 of mica or other insulating material are interposed between adjacent plate portions. It will be understood that the inductor member shown in Fig. 6 has three "turns" with the result that the strength of the magnetic field is increased and a greater heating effect is obtained. With the construction shown, the middle plate portion 41 extends outwardly somewhat beyond the respective upper and lower plate portions 40 and 42. A three turn conduit 44 is wound around and secured to the plate portions 40, 41 and 42, the turns being offset or staggered so that the tubing may be of sufficient diameter to adequately cool the plate portions 40, 41 and 42 without interfering with the desired close spacing of said plate portions.

In the modification shown in Fig. 7, the inductor comprises upper and lower plate portions 45 and 46 which are of wedge shaped cross-section and which are symmetrically disposed with respect to the central horizontal plane of the inductor. A central plate portion 47 is disposed between and extends outwardly somewhat beyond the plate portions 45 and 46 and strips of insulating material are interposed between the plates as indicated at 48. A three turn cooling fluid conduit 49 is secured to the plate portions, and with this arrangement, it is not necessary that the turns of the conduit be offset or staggered to the extent shown in Fig. 6 although the central turn is shown spaced outwardly a short distance from the upper and lower turns so that clearance is available for good electrical contact with the central plate portion.

In the modification shown in Fig. 8, upper, middle and lower plate portions 55, 56 and 57, respectively, are provided and each of these is of generally wedge shaped cross-section. Strips of insulating material are interposed between adjacent plate portions as at 59. Because of the wedge shape of all the plate portions, the turns of the cooling fluid conduit 58 may be disposed in a common vertical plane and it is not necessary that the turns of the tube portion be offset or staggered.

The modification shown in Fig. 9 comprises upper and lower plate portions 62 and 63, respectively, and a central plate portion 64, there being interposed strips of insulating material if desired as at 65. The outer edge of each of the plate members is enlarged as indicated at 66 and each of these enlarged outer portions is formed with a passage 67 through which cooling fluid may be circulated. Accordingly, it will be apparent that it is not necessary to provide a separate tube portion secured to the inductor but, instead, the outer part of the plate portions may be enlarged to provide space for a cooling fluid cavity which is sufficiently large to adequately cool the inductor. The inner surfaces of the respective plate portions, however, are relatively narrow and carry most of the current so that the magnetic field is effectively localized and concentrated along a narrow band of the object to be heated.

A further modification of the invention is shown in Figs. 10 to 12, inclusive, in which the articles to be heated as at 65 are supported upon a conveyer belt or platform 66 which is moved along a support 67 by any suitable means, not shown. The heating zone is established between two plate assemblies 68 and 69 which may be of equal length and disposed symmetrically with respect to the central vertical plane of the inductor, Fig. 11. Each of the plate assemblies 68 and 69 may comprise upper, middle and lower plate members 70, 71, 72, and strips 73 of insulating material interposed between adjacent plate members. As shown best in Figs. 10 and 13, each plate member of the assembly 69 is divided into two separated plate portions by a centrally located air gap as at 74. The plate assemblies 68 and 69 are cooled and supported by a cooling fluid conduit 75 of non-ferrous tubing which is brazed or soldered to the outer edges of the plate members of each plate assembly so as to form a three turn coil. Both of the middle plate members 71 may project outwardly beyond the adjacent plate members 70 and 72 so that the turns of the coil may be offset or staggered as indicated in Fig. 11, the middle turn of the coil being spaced outwardly from the upper and lower turns. As is apparent from Fig. 13, the juncture between adjacent turns of the cooling fluid coil 75 is effected at the air gaps 74. The end portions 76, of the turns of the cooling fluid coil 75 are bent upwardly into a vertical plane so that the articles 65 may move through the heating zone between the plate assemblies 68 and 69 without touching the ends of the coil. It will be understood that current is supplied to the inductor in the same manner as described in connection with the inductor shown in Figs 1 to 4 and parts similar to those already described are designated by like reference characters. The respective end portions 77, 77 of the conduit 75 are suitably secured as by brazing or soldering to the conductors 19 and 20 so as to communicate with the respective passages 21 and 22. Accordingly, during operation of the inductor a continuous stream of cooling fluid may be passed through the inlet pipe 23, passage 21, the adjacent end portion 77, cooling fluid conduit 75, end portion 77, passage 22, and outlet pipe 24, to thereby cool the whole assembly.

In order to form a mechanically rigid structure, a bracket 78, formed of insulating material, may be attached to the conductor 19, 20 and the upper plate members 70, as by screws 79 and a plate 80 of insulating material may be secured to the conductors 19, 20, as by screws 81. As the articles 65 pass through the heating zone, the surfaces of said objects adjacent the respective plate assemblies 68, 69 are subjected to a very intense electromagnetic field with the result that said surfaces are rapidly brought to the desired hardening temperaure before the heat penetrates excessively to the inner portions of the objects. Accordingly, the surfaces of the objects may be hardened while the physical properties of the interior portions may be left unaffected.

It will be apparent that substantial economies of operation are affected by utilizing the type of inductor shown in Figs. 10 to 13, as the loading time is reduced to the minimum and handling costs are substantially diminished. Furthermore, the consumption of power is decreased since very little electrical energy need be expended in heating the interior portions of objects. The depth of the hardened zone may be minimized which is desirable in many industrial applications The modified form of inductor shown in Figs. 14 to 16, is particularly useful for brazing objects formed from copper or brass and the like which are heated inductively more slowly than ferromagnetic metals. A high intensity field is useful in brazing such objects since the portions of the object in the brazing zone are quickly brought up to the desired temperature before the heat is conducted away to other parts of the object. Referring to Fig. 16, the parts which are to be brazed together are shown at 85 and 86, respectively, the part 85 being formed, for example, of brass. The part 86 rests on a suitable support 87 which may be slidable on a member 87'. The support may carry one or more of the assemblies to be brazed. The joint between the parts is shown at 88 and the portion of the part 85 adjacent such joint is disposed between two plate assemblies 90, 90 between which a very intense electromagnetic field is established in the manner hereinafter described. A suitable brazing or soldering compound should, of course, be placed adjacent the joint 88 and a suitable flux applied thereto.

Each of the plate assemblies 90, 90 may comprise upper, middle and lower plate portions 91, 92, 93, Fig. 16, and strips 94 of insulating material interposed therebetween. The plate assemblies 90, 90 may be of equal length and symmetrical with respect to the central vertical plane of the inductor, Fig. 14, each plate assembly being held together by pins as at 95 which are suitably insulated from the respective plate portions 91, 92 and 93. Each of the plate portions has an inturned end section as at 96 and the facing ends of said end sections are separated by an air gap as at 97.

A three turn cooling fluid conduit 98 is brazed or otherwise suitably secured to the outer surface of the plate portions, the juncture between adjacent turns of the coil being effected at the air gap 97. As shown in Fig. 16, the middle plate portion 92 may extend outwardly beyond the plate portions 91 and 93 so that the turns of the conduit 98 are offset or staggered in the above noted reasons. The conduit coil 98 is bent downwardly out of the plane of the plate assemblies 90 at one end of the inductor as indicated at 99 to allow the work assemblies to be easily inserted into the heating zone or removed therefrom.

The end portions 100, 100 of the conduit 98 may be secured to suitable supporting and connecting terminal structure as at 101, 102 and 103. The modified constructions shown diagrammatically in Figs. 5 to 9, inclusive, are, of course, adapted for use with the inductors of the types shown in Figs. 10 to 17, inclusive, as obviously the cross-section of the last-named inductors may be modified so as to utilize the constructions shown in Figs. 5 to 9, inclusive.

While the invention has been described with respect to preferred embodiments which have given satisfactory results, it will be understood by those skilled in the art, after understanding the invention, that various other changes and modifications may be made without departing from the spirit and scope of the invention and it is intended, therefore, in the appended claims to cover all such changes and modifications.

What is claimed as new and desired to be secured by Letters Patent, is:

1. High frequency induction heating apparatus comprising an inductor having a plurality of closely spaced turns, each turn being formed with an outer portion including a cooling fluid passage, and an inner portion having a thin inner edge for facing the work surface to be heated, the spacing between centers of the passages in adjacent turns being substantially greater than the spacing between center lines of the inner edge surfaces of the same turns, whereby the magnetic flux at said inner edges is concentrated within a relatively narrow band as compared with the width of the band of flux which would be established about the cooling fluid passage portions of the same turns in the absence of said inner portions.

2. High frequency induction heating apparatus comprising an inductor having a plurality of closely spaced turns, each turn being formed with an outer portion including a cooling fluid passage, the passage in one turn being offset outwardly of the turn with respect to the passage in an adjacent turn or turns and positioned to thereby afford greater clearance between such passages in directions axially of the coil, and each turn having an inner portion with a thin inner edge for facing the work surface to be heated, the spacing between centers of the passages of adjacent turns being substantially greater than the spacing between center lines of the inner edge surfaces of the same turns.

3. High frequency induction heating apparatus comprising an inductor having a plurality of closely spaced turns, each turn being formed with an outer portion including a cooling fluid passage, and an inwardly directed portion of wedge shaped cross-section with an inner edge for facing the work surface to be heated, said edge being thin as compared with the cross section of said passage and closely spaced with respect to the corresponding edge on the adjacent turn or turns, the spacing between centers of the passages of adjacent turns being substantially greater than the spacing between the inner edges of the same turns.

4. High frequency induction heating apparatus comprising an inductor having a plurality of closely spaced turns, each turn being formed with an outer portion of relatively large cross-section, and an inwardly directed portion of wedge shaped cross-section for facing the work surface to be heated, the inner edges of the latter portions on adjacent turns converging whereby the magnetic flux at said inner edges is concentrated within a relatively narrow band.

5. An inductor comprising a pair of metal turns of a cross-section which is relatively thin as measured in directions axial of the turn as compared with the width of the cross-section as measured in directions radially of the turn, interposed insulation means for retaining said turns in closely spaced relation, and a pair of turns of metal tubing for cooling fluid, secured respectively to said first named turns near the outer edges of the surfaces thereof which are opposite from the interposed insulation.

6. An inductor comprising a plurality of turns of metal tubing for cooling fluid, the turns being elongated to provide a conveyor path between the longer sides thereof, the ends of the turns being positioned outside such path, and elongated metal plates secured along each of said longer sides, longitudinal edges of said plates on adjacent turns being closely spaced and positioned to face the work surfaces to be heated in travelling along said path, the total thickness of said edges which face the work, together with the spaces therebetween, being substantially less than the total of the diameters of the cross-sections of the tubing turns and the spaces therebetween.

7. High frequency induction heating apparatus comprising an inductor having a plurality of closely spaced turns, each turn being formed with an outer portion including a cooling fluid passage, the passage in one turn being offset outwardly of the turn with respect to the passage in an adjacent turn or turns and positioned to thereby afford greater clearance between such passages in directions axially of the coil, and each turn having an inner portion with a thin inner edge for facing the work surface to be heated, the spacing between centers of the passages of adjacent turns being substantially greater than the spacing between center lines of the inner edge surfaces of the same turns, each of said turns being elongated to provide a conveyor path between the longer sides thereof, and the ends of the turns at least at one end of the inductor being so shaped and positioned as to be outside said path.

8. High frequency induction heating apparatus comprising an inductor having a plurality of spaced turns formed of metal tubing adapted to receive a stream of cooling fluid, and metal plate-like portions extending inwardly from such tubing, the inner edge surfaces of such plate-like portions being adapted to face the work surfaces to be heated, said portions on each turn being closely spaced from corresponding portions on the adjacent turn or turns, and such portions being so shaped and positioned that the total thickness of their said inner edge surfaces, together with the spaces therebetween, is substantially less than the total of the diameters of the cross-sections of the tubing turns and the spaces therebetween.

9. High frequency induction heating apparatus comprising an inductor having a plurality of spaced turns formed of metal tubing adapted to receive a stream of cooling fluid, and metal plate-like portions extending inwardly from such tubing, the inner edge surfaces of such plate-like portions being adapted to face the work surfaces to be heated, said portions on each turn being closely spaced from corresponding portions on the adjacent turn or turns, and such portions being so shaped and positioned that the total thickness of their said inner edge surfaces, together with the spaces therebetween, is substantially less than the total of the diameters of the cross-sections of the tubing turns and the spaces therebetween, each of said turns being elongated to provide a conveyor path between the longer sides thereof, said plate-like portions being secured along said longer sides, and the ends of the turns at least at one end of the inductor being so shaped and positioned as to be outside said path.

ROBERT J. STANTON.

REFERENCES CITED

The following references are of record in the file of this patent:

UNITED STATES PATENTS

| Number | Name | Date |
|---|---|---|
| 1,963,481 | Willcox | June 19, 1934 |
| 1,975,436 | Sorrel et al. | Oct. 2, 1934 |
| 2,003,855 | Fredrickson | June 4, 1935 |
| 2,308,240 | Goodridge | Jan. 12, 1943 |
| 2,397,990 | Sherman | Apr. 9, 1946 |